United States Patent
Ramanathan et al.

(10) Patent No.: US 8,174,962 B2
(45) Date of Patent: May 8, 2012

(54) GLOBAL BROADCAST COMMUNICATION SYSTEM

(75) Inventors: ShunmugaPriya Ramanathan, Madurai (IN); Giri B. Guntipalli, Bangalore (IN); Balaji Krishuasamy, Madurai (IN); Arun Honnappa, Challakere (IN); Kalyani Korubilli, Visakhapatnam (IN); Nitin Gadura, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 305 days.

(21) Appl. No.: 12/103,523

(22) Filed: Apr. 15, 2008

(65) Prior Publication Data

US 2009/0257431 A1 Oct. 15, 2009

(51) Int. Cl.
*H04L 12/26* (2006.01)

(52) U.S. Cl. ............... 370/216; 370/395.31; 370/401

(58) Field of Classification Search ............... None
See application file for complete search history.

(56) References Cited

U.S. PATENT DOCUMENTS

| | | | | |
|---|---|---|---|---|
| 4,377,000 A * | 3/1983 | Staab | ............... | 714/55 |
| 5,404,508 A | 4/1995 | Konrad et al. | | |
| 5,557,798 A * | 9/1996 | Skeen et al. | ............... | 705/35 |
| 5,812,748 A | 9/1998 | Ohran et al. | | |
| 2009/0201799 A1 * | 8/2009 | Lundstrom et al. | ............... | 370/217 |

OTHER PUBLICATIONS

Cho, S.U.; Hong, S.H.;"Fault Tolerant BBMD in the BACnet/IP Protocol" Industrial Technology, 2006. ICIT 2006. IEEE International Conference on Dec. 15-17, 2006, Digital Object Identifier 10.1109/ICIT.2006.372651, pp. 2747-2751.*
Hong, Seung Ho; "Implementation of Fault Tolerant BBMD in the BACnet/IP Protocol" Advanced Language Processing and Web Information Technology, 2007. ALPIT 2007. Sixth International Conference on Aug. 22-24, 2007 , Digital Object Identifier 10.1109/ALPIT.2007.54, pp. 589-594.*
Cho, S.U.; Hong, S.H.; "Fault Tolerant BBMD in the BACnet/IP Protocol" Industrial Technology, 2006. ICIT 2006. IEEE International Conference on Dec. 15-17, 2006, Digital Object Identifier 10.1109/ICIT.2006.372651, pp. 2747-2751.*

* cited by examiner

*Primary Examiner* — Chirag Shah
*Assistant Examiner* — Salvador E Rivas
(74) *Attorney, Agent, or Firm* — Seager, Tufte & Wickhem LLC

(57) ABSTRACT

A global broadcast communication network system having a plurality of subnets. The system may incorporate a building and automation control network (BACnet) protocol. Each subnet may have a one active BACnet broadcast management device (BBMD) for broadcasting messages to other subnets. Also, there may be BIP (BACnet over IP) devices, such as controllers, tools and stations, in the subnets. One of the BIP devices in each subnet may be configured or enabled as a passive BBMD. If there is a failure of the active BBMD in a subnet, then the passive BBMD of the same subnet may detect the failure and assume the role of the active BBMD to minimize or eliminate possible disruption of communication across the subnets. Each BBMD may have and maintain a broadcast distribution table (BDT) which contains information about BBMDs in other subnets. Each BBMD may provide updated BDT information to the other BBMDs.

9 Claims, 4 Drawing Sheets

GLOBAL BROADCAST COMMUNICATION SYSTEM

BACKGROUND

The invention pertains to communication systems and particularly to BACnet communication systems.

SUMMARY

The invention is an approach and system for improving reliability of a BACnet global broadcast communication system.

DESCRIPTION

Figure 1:
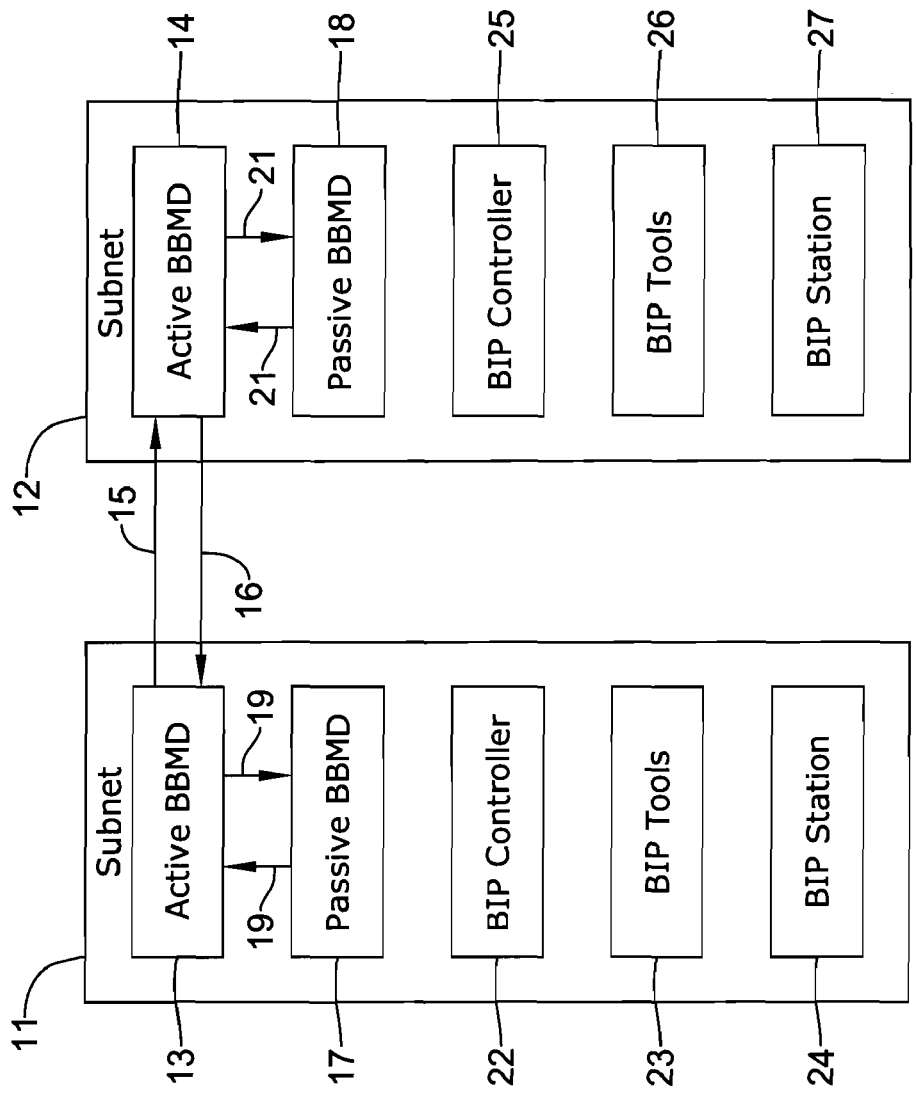
FIG. 1 is a diagram of a communication system having BACnet over IP devices across several subnets.

BACnet is an open standard data communications protocol for building automation and control networks, such as for HVAC (heating, ventilation and air conditioning) applications. It was developed under the auspices of ASHRAE (American Society of Heating, Refrigeration and Air-conditioning Engineers).

It may be often necessary to set up multiple networks to communicate with each other. This may be required because different network types with different characteristics are being used. For multiple networks to communicate, there needs to be a common language or protocol used by the devices on those networks.

A protocol may define the format of the message packets exchanged between devices. It may also define the format of the message frame, the surrounding envelope that determines what destination address should be used, and what protocol the frame is using. Some protocols, such as BACnet, may define the entire frame and packet together. Other protocols, such as IP (Internet protocol), may state within the frame that a different protocol is to be used to decode the packet within.

In BIP (BACnet over IP) communication, broadcast messages may be filtered by the IP routers. So to establish BACnet communication across subnets, a BBMD (BACnet Broadcast Management Device) should be enabled in each of the subnets. BBMDs may be used to send global broadcast messages in a BACnet/IP network. A BBMD may maintain a BDT (broadcast distribution table) for containing information about other BBMDs in other subnets.

Two types of forwarding (i.e., one hop and two hop forwarding) the messages may be supported. In one hop forwarding, a BBMD in a subnet may automatically do a broadcast to all devices in another subnet. However, just few IP routers may support this one hop forwarding. In two hop forwarding, a BBMD in a subnet may do a unicast transfer of a global broadcast message to all other BBMDs. The BBMDs in other subnets may do a local broadcast of that message within its subnet. Two hop forwarding should be well accepted since it may work well independent of the IP router.

A BBMD feature may be enabled in a BIP device to have BIP communication across subnets. A factor of concern may be that there should be only one BBMD in a subnet. Otherwise, more that one BBMD may lead to a continuous cyclic transmission of broadcast messages. If a BBMD fails in a subnet, then the broadcast communication of that subnet with other subnets may be broken even though other BIP devices (controllers or any tool or workstation) in that subnet are working well.

In some scenarios, it appears that only a manual method of replacing the failed BBMD is available. Initially, a BBMD failure needed to be detected and then it had to be replaced manually to regain BACnet broadcast communication. The present approach and system may be used for remedying this situation. A BBMD may be enabled in a subnet only if more than one BIP device are present in that subnet. Since a BBMD feature may be enabled in a BIP device and there should be only one active BBMD in a subnet, then a BIP device may be made to act as a passive BBMD, which should support the following functionalities. First, using a configuration tool, the BIP device may be enabled as a passive BBMD and active BBMD information may be mentioned in the BIP device's subnet.

Second, in addition to its normal work, the BIP device may monitor the working status of the configured active BBMD in its subnet and ensure that its BDT list is synchronous with the BDT list of the active BBMDs.

Third, once the active BBMD fails in the BIP device's subnet, virtually immediately, within few minutes (e.g., ten minutes), the BIP device should assume the role of the active BBMD, and provide information about its BBMD role to other BBMDs present in other subnets so that communication across subnets will remain undisturbed and that the BDT will remain in sync for all the BBMDs in that network.

Fourth, if the active BBMD that failed comes back online, several situations may exist. One, if it is a third party BBMD (whose firmware is not under your control), then the BIP or other passive device, which has taken the active role of the failed BBMD, should detect the return of the active BBMD and go back to its initial state of polling the active BBMD in its subnet. Also, the BIP or other passive device, which took up the role of the previously failed active BBMD, should take care of updating the BDT information to the returned active BBMD in its subnet (since there is a possibility of the BDT getting changed in other subnets) and also should update the BDT to other BBMDs in other subnets to inform that the failed BBMD has come back online and will take back the active BBMD role.

Two, if the failed device is one's own device where one has control of the firmware behavior, then initially at start up, then the BIP or other passive device, which may take up the role of the previously failed active BBMD, should check whether any active or passive BBMD already exists, and assume the proper role accordingly.

If there is some network problem for the active BBMD (not a third party) and it is not restarted, then there should be some approach to ensure its network connectivity and if the BIP or other passive device detects that network has gone off and come back again, then it should check whether an active BBMD is already present in its subnet, and should assume the proper role accordingly.

An active BBMD failure may happen because of a network cable problem, physical wiring problem, a BBMD overload which could result in a hanging problem, or other items. In some scenarios, it appears that BACnet has not been provided a standard to resolve the communication failure if the BBMD fails. Also, there may be some cases where no tool is available to check whether the failed BACnet IP device is a BBMD or not. Further, in the certain scenarios, a solution may be based on operator/engineer capability to detect the failure and resolve the communication issue. In the present approach, a BIP may be designated to be a redundant and passive BBMD.

If the active BBMD fails, the passive BBMD may automatically assume the active BBMD role and do broadcast communication across subnets.

There are numerous benefits with the present approach for responding to a failed active BBMD. One is that the BACnet devices in a subnet need not depend solely on the configured BBMD in its subnet to achieve broadcast communication. In the some scenarios, there appears to be no specialized tool to identify whether the failed BIP device is a BBMD or not. As a result, detection time of a BBMD failure may be ambiguous in that it could vary from 5 minutes to 24 hours). Broadcast communication recovery may depend significantly on this detection time.

The present approach and system may be an automated way of recovery of global broadcast communication due to, for instance, a failed BBMD. The present system may save time for the field operators and the probability of losing data across network may be much less than that of other approaches, and it may increase the BACnet controller's efficiency in sharing data across various networks. A guaranteed communication recovery may be provided with the present system in which a BBMD feature is to be enabled in other BIP devices/controllers so that one of the latter will, as a passive BBMD, monitor the active status of the BBMD and assume an active role in case of a BBMD failure. This system may also work with third party BBMDs.

The present system may include a configuration tool for selecting active and passive BBMDs in a subnet. This system may involve selection of an active BBMD and a passive BBMD (of which the latter may be a BACnet/IP—BIP device) in a subnet having a smaller load than other BIP devices. A calculation of the load may be based on points shared from/to another BACnet device, a number of BACnet objects configured, and the routing functionality supported.

The present system may ensure that the passive BBMD has an appropriate BDT similar to that of the active BBMD in that subnet. After downloading binaries to the controllers, the approach may ensure that the active/passive BBMDs are working properly as per a specification with the help of a developed small tool to view the BDT.

Instead of data backup needed in some other systems, the passive BBMD may maintain an updated BDT and take the active role if the active BBMD fails and inform the other BBMDs in other subnets of the role change Since there may be many subnets, the BDT should be synchronized relative to all of the subnets.

As may be the case for other systems, no two processors are needed for the present system. Since there may be multiple BACnet over IP (BIP) devices, enabling the BBMD feature with the present system should be sufficient. No extra hardware needed. Also, no data back-up is needed with the present approach. The broadcast communications recovery may be guaranteed within a certain period of time, such as five or ten minutes, of an active BBMD failure without a need of extra hardware.

FIG. 1 is a diagram of the communication scheme of BIP devices across several subnets. An active BBMD 13 of subnet 11 may provide a unicast 15 of global BACnet broadcast messages across subnets 11 and 12. Likewise, an active BBMD 14 subnet 12 may provide a unicast 16 of global BACnet broadcast messages. A BIP may be designated as a passive BBMD 17. Communications 19 between passive BBMD 17 and active BBMD 13 may include reading and updating the BDT. A BID may be designated as a passive BBMD 18. Communications 21 between passive BBMD 18 and active BBMD 14 may include reading and updating the BDT. Subnet 11 may also include a BIP controller 22, BIP tools 23, station 24, and so forth. Similarly, subnet 12 may also include a BIP controller 25, BIP tools 26, a BIP station 27, and so forth.

Figure 2A:
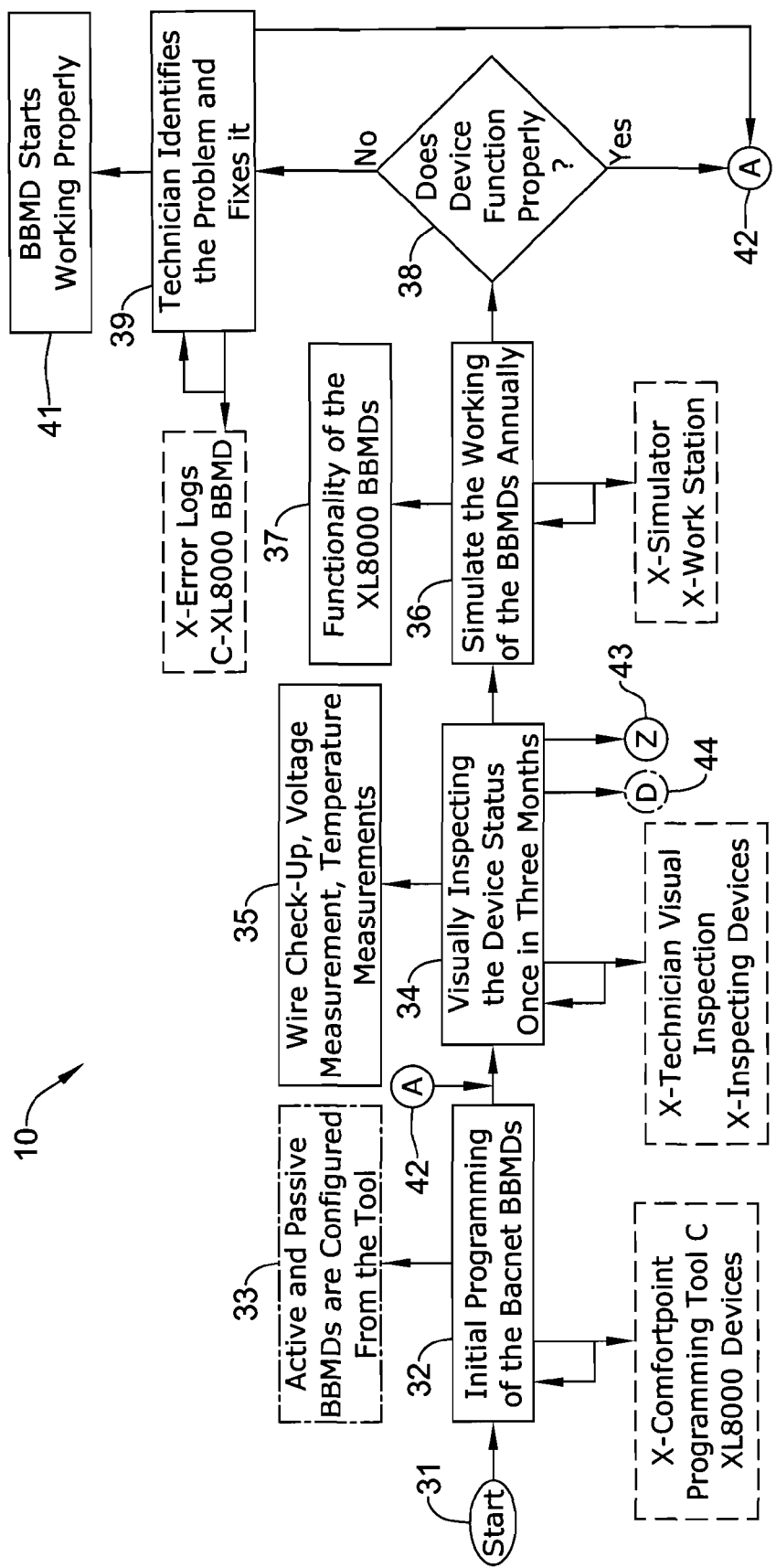
FIGS. 2a, 2b and 2c show a flow diagram of a BACnet global broadcast communication system having a back-up broadcast management device for a subnet of the system.
Figure 2B:
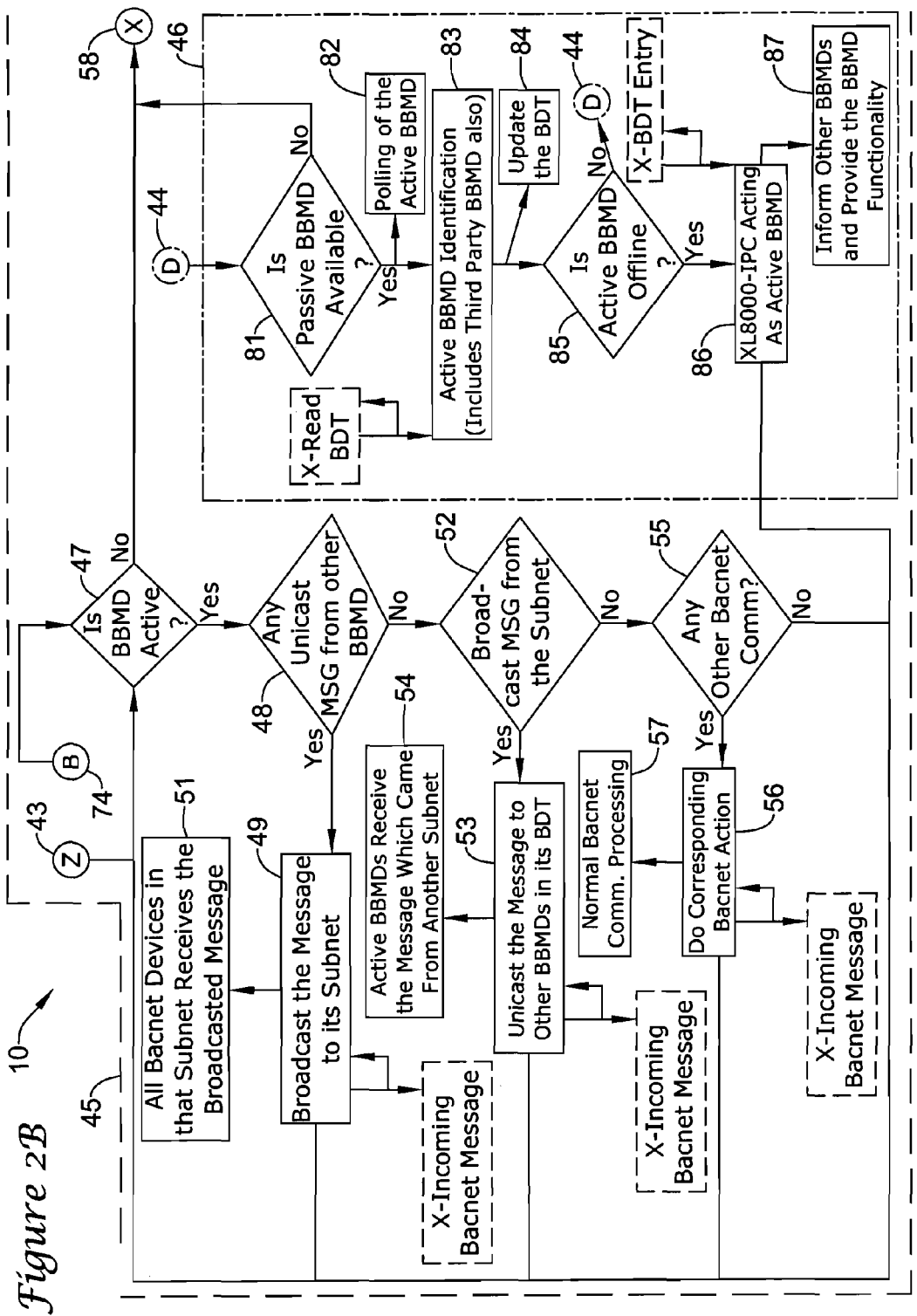
Figure 2C:
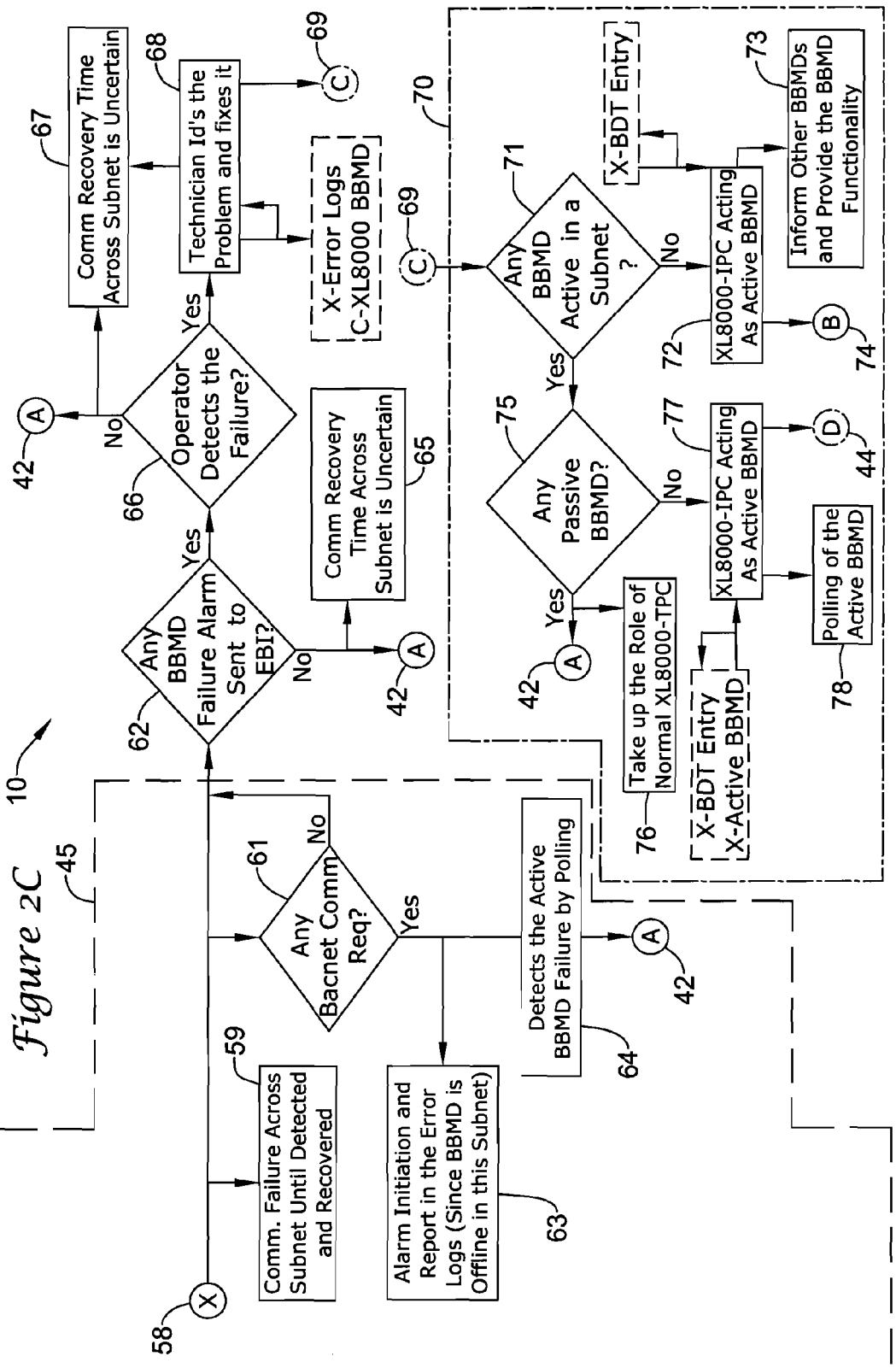

FIGS. 2a, 2b and 2c are a flow diagram of the present approach and system 10. Particular features of present system 10 may be emphasized by bold "· — · —" type lines and circles. System 10 may be described in various ways, other than the present way and instance.

A start may begin in FIG. 2a at a place 31 going to an initial programming of the BACnet BBMDs at block 32. A ComfortPoint™-Internet Protocol Controller (CP-IPC) programming tool C may be used. (Trademark items noted herein may be those of Honeywell International Inc.) FIGS. 2a-2c show an approach for improving the reliability of BACnet broadcast communication messages. By using a redundant BBMD approach, the maintainability of third party BBMD devices may be improved, in addition to CP-IPC BBMD devices.

Active and passive BBMDs may be configured with the tool as indicated in block 33. From block 32 may follow a block 34 where there is visually inspecting a device status once in three months. This period may be of another length or the inspecting may be done as needed or desired. A technician may do a visual inspection and/or use inspecting devices. The inspection may include wire check-ups, voltage measurements, and so on, as indicated in block 35.

Block 36 may follow block 34. Block 36 may indicate simulating a working of the BBMDs on an annual basis, or other period basis. This activity may be performed with a simulator, work station, or the like. The simulating may reveal a functionality of the CP-IPC BBMDs indicated in block 37. A question may be whether the device functions properly as asked in symbol 38. If the answer is no, then at block 39 a technician may identify the problem and fix it, based possibly on looking at the CP-IPC BBMD and error logs. If fixed, then the BBMD may start working properly as indicated in block 41. If so, then this condition may lead to a place 42 which goes to the entry of block 34 as noted herein. If the answer to the question is symbol 38 is yes, then this answer may go to place 42 which again leads to the entry of block 34.

An output at places 43 and 44 from block 34, indicating the BBMD device to be working properly, may go to a high level block 45 relating to whether the BBMD is active and to a sub high level block 46 relating to whether a passive BBMD is available, respectively, in FIG. 2b. A path from place 43 may go to a symbol 47 asking a question whether the BBMD is active. If the answer is yes, then a path may go to symbol 48 which asks a question whether there is any unicast message from another BBMD. If the answer is yes, then the path may go to a block 49 which may indicate broadcasting the message to its subnet. It may be an incoming BACnet message. The BACnet devices in that subnet may receive the broadcasted message as indicated in block 51. After block 49, a path may lead to the question in symbol 47 again.

If the answer is no to the question in symbol 48, then the path may lead to a question in symbol 52 about whether there is a broadcast message from the subnet. If the answer is yes, then the path may go to block 53 which indicates to unicast the message to other BBMDs in its BDT. The message may be an incoming BACnet message. Active BBMDs may receive the message which came from another subnet, as indicated in block 54. From block 53, a path may lead to the question in symbol 47 again.

If the answer is no to the question in symbol 52, then the path may lead to a question in symbol 55 about whether there is any other BACnet communication. If the answer is yes, then the path may lead to a block 56 which indicates to do a corresponding BACnet action. The message may be a BACnet message. A block 57 may indicate that there be normal BACnet communication processing of the message. From block 56, a path may lead to the question in symbol 47 again. If the answer is no to the question in symbol 55, then a path may lead to the question in symbol 47 again.

If the answer to the question whether the BBMD is active, in symbol 47, is no, then a path, via a place 58 and indicative of a communication failure across the subnet until detected and recovered as indicated in a block 59, may lead to a symbol 61 and a symbol 62 in FIG. 2c. Symbol 61 may ask a question about any BACnet communication requirement. If the answer is yes, then a path, indicating an alarm initiation and report in the error logs (since the BBMD is offline in this subnet) as noted in block 63, may go to a block 64 which indicates the active BBMD failure by polling. From block 64, the path may lead to place 42 which ultimately goes to block 34 in FIG. 2a.

If the answer to the question in symbol 61 is no, then the path may lead to the symbol 62 which asks a question whether any BBMD failure alarm was sent to an EBI (Enterprise Buildings Integrator™). The path from a no answer at symbol 47 may also lead to this symbol 62, as noted herein. If the answer to the question of symbol 62 is no, then the path, indicating in block 65 that the communication recovery time across the subnet is uncertain, may go to place 42 which ultimately goes to block 34 in FIG. 2a.

If the answer to the question in symbol 62 is no, then the path may go to a symbol 66 which has the question of whether the operator detects a failure. If the answer is no, then the path may lead to place 42 having the destination noted herein. This path may indicate a communication recovery time across the subnet being uncertain as indicated by block 67.

If the answer to the question in symbol 66 is yes, then the path may lead to a block 68 where a technician identifies the problem and fixes it. Error logs of the CP-IPC BBMD may be relied on. Also, at this point the communication time across the subnet may be uncertain as indicated by block 67. Upon fixing the identified problem, the path may lead to a place 69 which goes to a symbol 71 of a high level block 70.

Symbol 71 may ask the question whether any BBMD is active in a subnet. If the answer is no, then the path may lead to a block 72 indicating a CP-IPC acting as a BBMD. This activity may include informing other BBMDs and providing the BBMD functionality, as indicated in block 73. A BDT entry may be made here. From block 72, the path may lead to a place 74 which ultimately goes to symbol 47 in FIG. 2b, asking the question whether the BBMD is active. The yes and no answers and consequential paths are indicated, respectively, herein.

If the answer to the question in symbol 71 is yes, then the path may lead to a symbol 75 which asks whether there is any passive BBMD. If the answer to the question in symbol 75 is yes, then the path may lead to place 42 which goes to block 34 in FIG. 2a. This path may indicate a taking up the role of a normal CP-IPC, i.e., a BIP component, as indicated in a block 76.

If the answer to the question in symbol 75 is no, then the path may lead to a block 77 which indicates the CP-IPC acting as a passive BBMD. This may also include a polling of the active BBMD devices, as indicated in a block 78. Also, a BDT entry relative to the active BBMD may be made. The path from block 77 may lead to a place 44 which goes to a symbol 81 of the sub high level block 46.

Symbol 81 may ask whether a passive BBMD is available. If the answer is no. then the path may lead to place 58 which goes to symbols 61 and 62 as described herein. If the answer is yes, then the path may lead to block 82 which indicates a polling of the active BBMD. The path may also lead to a block 83 which indicates an active BBMD identification (which also includes third party BBMD identification). Here, a reading of the BDT may be made.

From block 83, the path may include updating the BDT as indicated by a block 84 and going to a symbol 85 that asks whether the active BBMD is offline. If the answer is no, then the path may go to place 44 which enters symbol 81, as noted herein. If the answer is yes, then the CP-IPC may be acting as an active BBMD, as indicated in block 86. A BDT entry may be made. Also, other BBMDs may be informed and provided the BBMD functionality, according to block 87. The path from block 86 may go to symbol 47 which asks whether the BBMD is active. The answers and respective paths from symbol 47 are described herein.

The following may relate to BBMD test cases. A configuration of BBMDs in a subnet may be checked. One CP-IPC may be configured as a BBMD in its subnet from a programming tool. BBMD related information may be fetched from an administrative binary and the controller should take the active BBMD role if configured from the ComfortPoint™ programming tool. BDT information may be displayed in a ComfortMAN™ option for the CP-IPC which has taken the BBMD role in its subnet. Additional ComfortMAN™ information may be available from Honeywell International Inc.

Data sharing of CP-IPC points across subnets may be checked. Since there may be a BBMD configured in each subnet, data sharing of CP-IPC points may be achieved across the subnets. Data sharing functionality which is supported within the subnet may also be achieved across the subnets.

To discover the BACnet devices (which are present in many subnets) in a single subnet may be checked. After configuring a BBMD in each subnet, one may discover the BBMD devices using ComfortPoint™ online tool which is in any one of the subnets where BBMD is configured. The BACnet devices (which are in different subnets and a BBMD is present in those subnets) may come online in the monitoring device (either as an online tool, BACbeat (BACnet evaluation, analysis and testing) or EBI Quick Builder™).

An upload and download of application binaries may be checked. After configuring a BBMD in each subnet, one may discover the BACnet devices which are in different subnets and do an upload or download of application binaries. The upload and download of application binaries may happen properly even if the devices are present in different subnets.

Monitoring BACnet devices which are in different subnets from a single central workstation may be checked. BACnet devices which are present in different subnets may be monitored and controlled by a single workstation. One may discover BACnet devices in Quick Builder™ and download them to the EBI which should be monitored and controlled by the central workstation.

Alarm generation may be checked. If EBI is in one subnet, the EBI may subscribe its notification information as a recipient list to the controllers which are in different subnets. If an alarm is generated in a controller which is in different subnet, the IPC may send a confirmed event notification to the EBI which is present in different subnets.

Change of value (COV) updating may be checked. One may change the present value of the point which is being monitored by the EBI. The change of value should be updated to the central workstation.

System alarm generation may be checked. There may be a system alarm display in the EBI. If the system alarm is generated in an IPC which is in different subnet, then the IPC may send the confirmed event notification to the EBI which is in some other subnet.

The following may relate to redundant BBMD test cases. Active and passive BBMD configuration using the ComfortMAN™ BBMD option may be checked. One may configure the active and passive BBMDs in the network to the CP-IPC which is going to take the active role in that subnet using the ComfortMAN™ option. One may check the BDT entry and the status of that controller which may be active if the configuration is proper. One may configure the active and passive BBMDs in the network relative to the CP-IPC which is going to take the passive role in that subnet using the ComfortMAN™ option. The BDT entry may be proper and that controller's status should be changed to passive. The same IP address may be configured for the active and passive BBMDs in a subnet. In the BDT list, that entry should not be displayed. An improper IP address may be configured. In the BDT list, that entry should not necessarily be displayed. Two active BBMDs may be configured in the controller's subnet itself. In the BDT list, the second entry may be rejected. Two passive BBMDs may be configured in the CP-IPC's subnet. In the BDT list, the second entry may be rejected. One may restart the CP-IPC which is playing the active BBMD role. The BDT list may be obtained properly from a flash memory. The CP-IPC which is playing the passive BBMD role may be restarted. The BDT list may be obtained properly from the flash memory. An entry from the list, which is not that controller's subnet entry, may be deleted. That particular entry may be removed from the BDT and the size should get updated properly. An entry from the list, which is that controller's subnet entry, may be deleted. The entire list may be removed in that controller and the status may be changed to inactive.

Polling of the active BBMD in a subnet may be checked. One may configure a passive BBMD in that subnet and ensure that the passive BBMD is polling the active BBMD. Every five minutes or so, the polling states may be reported in the error log. The passive BBMD may update the active BBMD status every two minutes or so in the ComfortMAN™ error logs. One may configure a passive BBMD in a subnet and make the active BBMD go offline at the run time. Within five minutes or so, the active BBMD failure status may be reported in the error log. Failure status updating may happen within two or three minutes. The passive BBMD may take the active role in that subnet within ten minutes or so of the active BBMD failure. But it may take only about three to four minutes. The updated BDT information may be provided to other BBMDs configured in that BDT within ten or so minutes. Two subnets may be checked showing the BDT to be updated within five minutes. BACnet communication recovery across subnets may be achieved within ten minutes or so of the active failure. Two subnets may be checked showing communication recovery to be achieved within five minutes. One may configure a passive BBMD and make the active BBMD go offline at the initial start up of the passive BBMD and check the BBMD communication across subnets. Within five minutes or so, the active BBMD failure status may be updated in the error log; however, it may be detected within three minutes. The passive BBMD may take the active role in that subnet within five minutes or so of the active BBMD failure, but could take the active role within three minutes. The updated BDT information may be provided to other BBMDs configured in that BDT within ten or so minutes. However, within three to four minutes, the BDT may get updated at other BBMDs. The BBMD communication recovery across subnets may happen within ten minutes or so of the failure of the configured active BBMD, but the communication recovery may be achieved within three to four minutes.

Two CP-IPC BBMDs active in a subnet may be checked. One active BBMD and one passive BBMD may be configured in a subnet. One may let the active one go offline and come online after sometime (after the passive BBMD takes the active role). The active BBMD, at the start up, may check whether any BBMD is active and detect whether the active BBMD is running in that subnet. It may detect that the passive BBMD is active. Since there is an active BBMD already, the BBMD may check any passive BBMD present in that subnet. Since there may be no passive BBMD present, it may take the passive BBMD role and update its BDT appropriately. Within five minutes or so, its status may be changed to passive. One may configure one active BBMD and one passive in a subnet and after sometime may configure one or more active BBMDs in the same subnet. The BBMD, at the start up, may check whether any BBMD is already active and detect the active BBMD running in that subnet. If there is an active BBMD, it may check any passive BBMD present in that subnet. If there is a passive BBMD, it may take the normal CP-IPC role. One may start the active and passive CP-IPC BBMDs at the same time. Only one BBMD may be active and the BDT entry may be proper as in other BBMDs in different subnets. It may be tested with the set up having two subnets.

Two CP-IPC BBMDs passive in a subnet may be checked. One may configure one active and one passive BBMD in a subnet, and after sometime configure one more passive BBMD in that same subnet. The BBMD may check whether any BBMD is passive in that subnet. If there is a passive BBMD, it may take the normal CP-IPC role. One may configure one active and one passive BBMD in a subnet and after sometime configure one more passive BBMD in that same subnet and restart that controller. The BBMD, at the start up, may get the BDT information from a flash memory. Within five minutes or so of start up, it may detect the passive BBMD and take the normal CP-IPC role.

Disabling and enabling BBMD redundancy for the passive BBMD may be checked. In the ComfortMAN™, there may be an option to disable the BBMD redundancy support. If the BBMD status is passive, and if the redundancy support is disabled, then it may stop polling the active BBMD in its subnet. If the redundancy support is disabled for the passive BBMD and if the active BBMD in its subnet fails, this controller should not take the active BBMD Role. Similarly, there may be an option to enable the BBMD redundancy support in the ComfortMAN™. Once enabled, the passive BBMD may start polling the active BBMD in its subnet. If the active BBMD is offline, the passive BBMD may take the active role and inform other BBMDs. BACnet communication across subnets may be recovered within five minutes or so of enabling the redundancy.

Disabling and enabling BBMD redundancy for the active BBMD may be checked. In the ComfortMAN™, there may be an option to disable the BBMD redundancy support. If the BBMD status is active, the redundancy support may be disabled but still work as an active BBMD. Similarly, there may be an option to enable the BBMD redundancy support in the ComfortMAN™. Once the redundancy support is enabled, the active and passive list may be there in its BDT list.

A BBMD online with network distortion may be checked. An active BBMD may be online but the BDT might not be functioning because of a network problem. The configured passive BBMD may take the active role and update the BDT relative to other BBMDs. Without a restart, the network may become proper for the initially configured active BBMD. The mentioned BBMD should take the passive role if there is an active BBMD already in the subnet.

A BBMD coming online with an old BDT may be checked. Both active and passive BBMDs in a subnet may have gone offline. At that time, the BDT may have been changed in other BBMDs. Then the active and passive BBMD in that subnet may come online. The BBMD in that subnet should get updated with the BDT entries from other active BBMDs.

Performance testing may be checked. BBMD offline detection time may be noted. An active BBMD offline may be detected by the passive BBMD within five minutes or so. There may be BBMD communication recovery across subnets. BBMD communication recovery may be achieved within ten minutes or so of the active BBMD Failure. Identification of two active BBMDs in a subnet may be noted and these BBMDs may be identified and recovered within twenty minutes or so of the second active BBMD coming online.

One may note the functionality of a BBMD. The BBMD may be necessary for broadcasting the BACnet messages across subnets. It may be possible for the CP-IPCs to communicate with third party controllers using the BBMD approach across subnets. Third party devices which support BACnet IP standards may be communicated with.

For unicast transmission, BBMD might not be necessary. To a question of how BACnet unicast messages will be communicated across subnets, unicast message transmission may be taken care of by an IP router.

It may be possible to detect whether the BBMD device is online. A question is how to check that the BBMD device is online but not working properly. As to a way by which it could be known that a BBMD device is working properly or not, one may read the BDT table from the BBMD to determine such. BACnet communication across subnets may be blocked if there is problem in BBMD in a subnet. By automating BBMD detection and problem resolution, it may be possible to ensure that detection and recovery be done within fifteen minutes.

An assumption may be that a BBMD problem is a network related issue and that there should be some polling mechanism to identify the device online. The polling may be a software based approach. An IP router may be present for network communication across the subnets. There may be one BBMD in a subnet for effective communication with that subnet. One may take care of more than one BBMD getting activated (during a switch over and so forth).

Even though BACnet does not have a standard relative to the present approach and system, an external communication format and timing relative to the automated approach should be acceptable within the BACnet environment.

There may be some configuration tool to inform the controller that it is going to take the role of a BBMD. Using such configuration tool, one may need to provide a BACnet broadcast distribution table.

A CP-IPC may communicate with third party devices which are in the same subnet. However, a third party device cannot necessarily respond to the present proprietary commands, but may to standard BACnet commands. Incidentally, two BBMDs in a subnet should not be active at a time. If two BBMDs are active, then the same BACnet command may be sent in a cyclic fashion within the subnet, which appears undesirable.

One may note testing strategies used for BBMDs. Test cases may be generated from the possible failure modes of the BBMD. The test cases may assure that a device can operate according to a BACnet standard. A unit test case document may be construed to cover performance related issues.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A global broadcast communication system comprising:
    two or more subnets; and
    wherein:
    at least one subnet comprises:
        an active broadcast management device; and
        a passive broadcast management device, wherein a BACnet over Internet protocol (BIP) component of the at least one subnet that has a smaller load than other BIP components of the at least one subnet is configured as a passive broadcast management device for the at least one subnet;
    a passive broadcast management device assumes a role of an active broadcast management device if the active broadcast management device fails;
    if a failed active broadcast management device of a subnet returns to a non-failed condition, then the passive broadcast management device leaves the role of the active broadcast management device if the active broadcast management device resumes the role of the active broadcast management device for the subnet;
    the broadcast management device comprises a broadcast distribution table containing information about other broadcast management devices;
    the passive broadcast management device reads and updates its broadcast distribution table from the broadcast distribution table of the active broadcast management device of the same subnet; and
    the passive broadcast management device of a subnet is for monitoring a status of the active broadcast management device of the same subnet and for ensuring that its broadcast distribution table is in synch with the broadcast distribution table of the active broadcast management device.

2. The system of claim 1, wherein the active broadcast management device is for providing unicasts of global building automation and control network (BACnet) broadcast messages among the subnets.

3. The system of claim 2, wherein a subnet comprises BACnet over Internet protocol (BIP) components.

4. The system of claim 3, wherein an active broadcast management device is enabled in a subnet if the respective subnet comprises more than one BIP component.

5. The system of claim 1, wherein the passive broadcast management device assumes the role of the active broadcast management device nearly immediately after the active broadcast management device fails.

6. A method for improving reliability of broadcast communication messages, comprising:
    providing two or more subnets;
    providing a configuration tool for configuring a subnet of the two or more subnets;
    selecting an active broadcast management device in the subnet with the configuration tool;
    providing two or more communication devices in the subnet; and
    selecting one of the communication devices in the subnet to operate as a passive broadcast management device with the configuration tool in case the active broadcast management device fails;

wherein the passive broadcast management device is for assuming a role of the active broadcast management device if the active broadcast management device fails;

wherein if the active broadcast management device becomes no longer failed, then the passive broadcast management device relinquishes the role as the active broadcast management device to the active broadcast management device;

wherein communication across the subnets is effected by the active broadcast management device;

wherein if the active broadcast management device fails, the passive broadcast management device sufficiently promptly assumes the role of the active broadcast management device so as to prevent a significant disturbance of communication across the subnets; and wherein a broadcast management device maintains a broadcast distribution table which contains information about broadcast management devices in the subnets.

7. The system of claim 6, wherein:

an active broadcast management device is a building automation and control network (BACnet) active broadcast management device for providing a unicast of global BACnet broadcast messages across the subnets; and communication devices in a subnet are BACnet over Internet protocol (BIP) components.

8. A system having reliable global broadcast communication, comprising:

a plurality of subnets;

an active broadcast management device in a subnet of the plurality of subnets, the active broadcast management device including a broadcast distribution table; and a passive broadcast management device in the subnet, the passive broadcast management device including a broadcast distribution table that is synchronous with the broadcast distribution table of the active broadcast management device, wherein the passive broadcast management device is determined according to a load of a plurality of devices in the subnet; and wherein:

if the active broadcast management device of the subnet exhibits a failure, then the passive broadcast management device of the same subnet assumes a role as the active broadcast management device for the subnet;

if the active broadcast management device becomes no longer failed, then the passive broadcast management device relinquishes the role as the active broadcast management device if the active broadcast management device resumes the role as the active broadcast management device for the subnet;

if the active broadcast management device resumes the role as the active broadcast management device, the passive broadcast management device updates the broadcast distribution table of the active broadcast management device;

communication across the plurality of subnets is achieved with a building and automation control network (BACnet) protocol over Internet protocol (BIP);

the passive broadcast management device monitors a status of the active broadcast management device;

upon detection of a change of status of the active broadcast management device to one of not being capable to assume the role as the active broadcast management device, then the passive broadcast management device nearly immediately assumes the role as the active broadcast management device;

one broadcast management device is or assumes the role of the active broadcast management device for one subnet; and a broadcast communication device maintains a broadcast distribution table for providing and/or receiving information, respectively, to and/or from broadcast distribution tables of broadcast management devices.

9. The system of claim 8, wherein if an active broadcast management device of a subnet fails, then a passive broadcast management device of the subnet detects a failed active broadcast management device and automatically assumes the role as the active broadcast management device to enable broadcast communication of the subnet with other subnets of the plurality of subnets.

* * * * *